(12) United States Patent
Chen

(10) Patent No.: US 8,544,090 B1
(45) Date of Patent: Sep. 24, 2013

(54) SYSTEMS AND METHODS FOR DETECTING A POTENTIALLY MALICIOUS UNIFORM RESOURCE LOCATOR

(75) Inventor: Joseph Huaning Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 254 days.

(21) Appl. No.: 13/011,077

(22) Filed: Jan. 21, 2011

(51) Int. Cl.
*G06F 11/00* (2006.01)
*G06F 11/30* (2006.01)
*H04L 29/06* (2006.01)

(52) U.S. Cl.
USPC ............... 726/22; 726/23; 726/24; 713/154; 713/188

(58) Field of Classification Search
USPC ...................................... 726/22–25
See application file for complete search history.

(56) References Cited

U.S. PATENT DOCUMENTS

| | | | |
|---|---|---|---|
| 8,176,430 B1 * | 5/2012 | Cahill | 715/760 |
| 2004/0054779 A1 * | 3/2004 | Takeshima et al. | 709/225 |
| 2008/0208868 A1 * | 8/2008 | Hubbard | 707/10 |
| 2009/0089859 A1 * | 4/2009 | Cook et al. | 726/3 |
| 2009/0138573 A1 * | 5/2009 | Campbell et al. | 709/218 |
| 2009/0165136 A1 * | 6/2009 | Obrecht et al. | 726/24 |

* cited by examiner

*Primary Examiner* — Andrew L Nalven
*Assistant Examiner* — Khang Do
(74) *Attorney, Agent, or Firm* — Holland & Hart LLP

(57) ABSTRACT

A computer-implemented method to detect a potentially malicious uniform resource locator (URL) is described. A presentation of a URL on a display of a computing device is detected. An actual URL associated with the URL presented on the display is obtained. The URL presented on the display is compared to the actual URL associated with the presented URL. If the URL presented on the display does not match the actual URL, the actual URL is prevented from being accessed.

16 Claims, 7 Drawing Sheets

SYSTEMS AND METHODS FOR DETECTING A POTENTIALLY MALICIOUS UNIFORM RESOURCE LOCATOR

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

As previously mentioned, computer networks may be used to communicate and share data between the various computers connected to the networks. In some instances, the shared data may be identified with a uniform resource locator (URL) that provides an address or location for the data. In one example, a user may be presented with a URL on a display of the computer. The user may view the URL and desire to access the data, file, program, etc. represented by the presented URL. In some cases, the presented URL may be different than the actual URL. As a result, when the user clicks on the presented URL, data associated with the actual URL may be accessed. In some examples, the actual URL may be associated with malware or other undesired data that may harm or affect the functionality of the user's computer. Accordingly, benefits may be realized by providing systems and methods for detecting a potentially malicious URL.

SUMMARY

According to at least one embodiment, a computer-implemented method to detect a potentially malicious uniform resource locator (URL) is described. A presentation of a URL on a display of a computing device is detected. An actual URL associated with the URL presented on the display is obtained. The URL presented on the display is compared to the actual URL associated with the presented URL. If the URL presented on the display does not match the actual URL, the actual URL is prevented from being accessed.

In one configuration, an extension type of the URL presented on the display is determined. In addition, an extension type of the actual URL associated with the URL presented on the display may be determined. In one example, an extension type of the URL presented on the display may be compared with an extension type of the actual URL.

In one embodiment, a determination may be made as to whether an extension type of the actual URL comprises an executable extension. If the extension type of the actual URL comprises an executable extension, the extension type of the URL presented on the display may be compared to the extension type of the actual URL.

If the URL presented on the display does not match the actual URL, the presented URL may be removed from the display. If the URL presented on the display does not match the actual URL, a notification message may be generated indicating that the actual URL is not accessible. If the URL presented on the display matches the actual URL, the actual URL may be allowed to be accessed. In one embodiment, the actual URL may be accessed by clicking on the URL presented on the display using an input device.

A computing device configured to detect a potentially malicious URL is also described. The computing device may include a processor and memory in electronic communication with the processor. The computing device may further include a display and a detection module configured to detect a presentation of a URL on the display of the computing device, and obtain an actual URL associated with the URL presented on the display. The detection module may be further configured to compare the URL presented on the display to the actual URL associated with the presented URL. If the URL presented on the display does not match the actual URL, the detection module may be configured to prevent the actual URL from being accessed.

A computer-program product for detecting a potentially malicious URL is also described. The computer-program product may include a non-transitory computer-readable medium having instructions thereon. The instructions may include code programmed to detect a presentation of a URL on a display of a computing device, and code programmed to obtain an actual URL associated with the URL presented on the display. The instructions may further include code programmed to compare the URL presented on the display to the actual URL associated with the presented URL. If the URL presented on the display does not match the actual URL, the instructions may include code programmed to prevent the actual URL from being accessed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
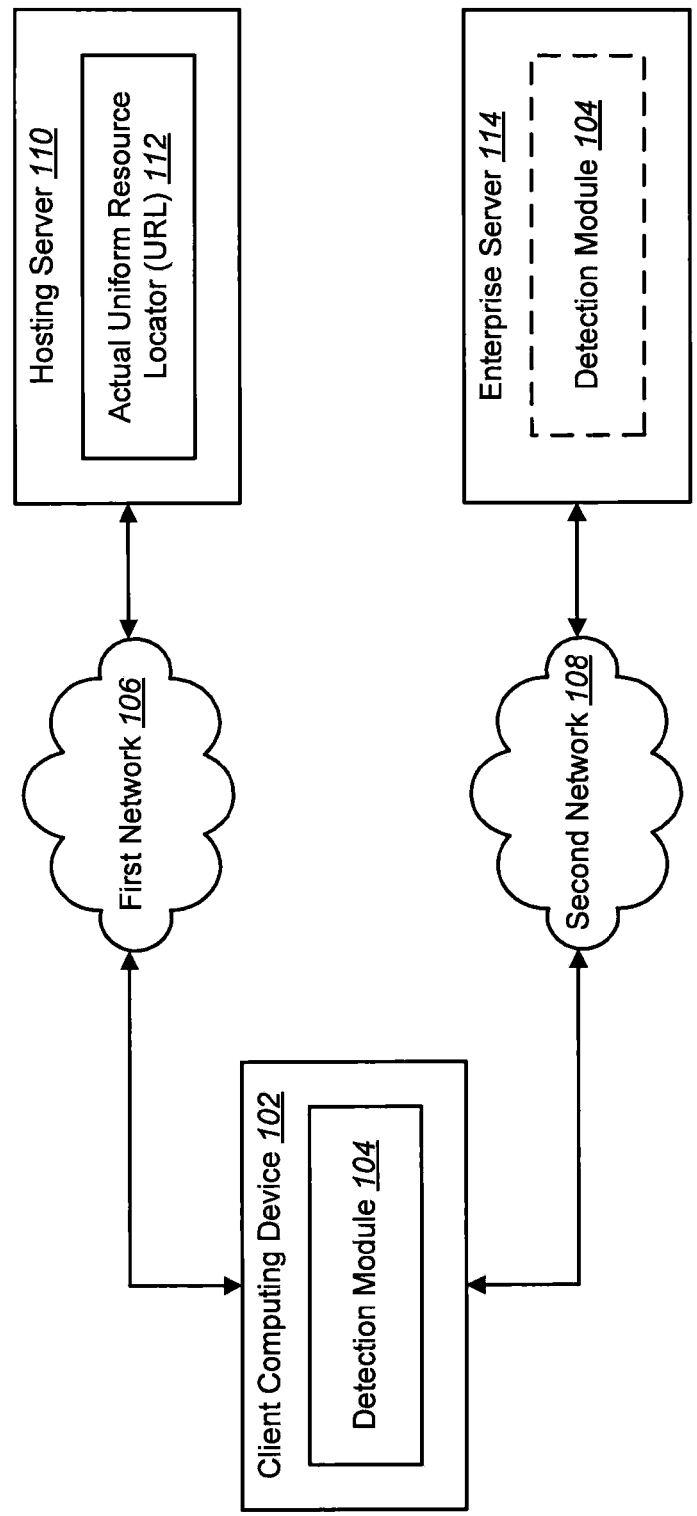
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing, a URL may be a Uniform Resource Identifier (URI) that specifies where an identified resource is available and the mechanism for retrieving it. In one example, the use of URLs may be for the addresses of websites on the World Wide Web. In one configuration, a URL may include (among other components) a domain name (alternatively, an Internet Protocol (IP) address). Domain names may be hostnames that identify IP resources such as websites. In one embodiment, URL masking may be the practice of hiding or obscuring the actual domain name of a website from a URL field of a web browser in favor of another domain name. For example, a first URL may be presented to a user. The user may click on the first URL and the web browser may be redirected to a second URL. As a result, the user may desire to access a website, file, program, etc. associated with the first URL, but instead, the web browser may access a website, file, program, etc. associated with the second URL. The website, file, program, etc. associated with the first URL may be harmless, but the website, file, program, etc. associated with the second URL may be malware or some other type of malicious entity. Thus, the user may click on the first URL believing a certain harmless website, file, program etc. will be accessed, but instead, the user may be redirected to a harmful website, file, program, etc. that may negatively affect the functionality of the user's computer.

As an example, an email may be sent to a potential victim. The following URL may be presented in the body of the email: hxxp://www.sharedocuments.com/library/PDF_Document21.02542010.pdf. This presented URL may be a link to a file with a .pdf extension (i.e., a non-executable file format). The actual URL, however, may point to the following: hxxp://members.multimania.co.uk/yahoophoto/PDF_Document21.02542010_pdf.scr. As a result, the actual URL may point to a malicious payload with an .scr extension (i.e., an executable format). By presenting to a user a less dangerous file extension (e.g., a non-executable file format), the user may be more likely to click on the presented URL. Clicking on the presented URL, however, may access a different URL that launches a malicious file, website, program, etc.

The present systems and methods may detect malicious URLs by comparing the presented URL with the actual URL. Detecting potential malicious URLs by comparing a presented URL to a file extension of an actual URL may include placing a particular emphasis on removing URLs pointed to executable extensions. The present systems and methods may remove or prevent malware that usually spreads through email, social engineering messages, and the like.

FIG. 1 is a block diagram illustrating one embodiment of an environment in which the present systems and methods may be implemented. In one example, a client computing device 102 may include a detection module 104. In one configuration, the client computing device 102 may be, but is not limited to, a personal computer (PC), a laptop, a server, a smartphone, a personal digital assistant (PDA), or any other type of computing device. The client computing device 102 may communicate with a hosting server 110 across a first network 106. The first network 106 may be the Internet and the hosting server 110 may host one or more websites, filed, programs, etc. Each entity hosted by the hosting server 110 may be associated with an actual URL 112 that indicates the Internet address of the particular website, file, program, etc. In one example, the client computing device 102 may request a website, file, program, etc. from the hosting server 110 by providing the hosting server 110 with the actual URL 112 associated with the desired entity.

In one configuration, the detection module 104 may detect when a URL presented to a user on the client computing device 102 does not match the actual URL 112. For example, a first URL may be presented to the user on a display of the client computing device 102. The user may click on the first URL, but instead of accessing the first URL, the hosting server 110 may access a second URL (such as the actual URL 112) that is different than the first URL. The detection module 104 may detect when the presented URL does not match the actual URL. In one embodiment, an enterprise server 114 may include the detection module 104. If the detection module 104 is installed on the enterprise server 114, the detection module 104 may remotely determine when a URL presented to the user via a display on the client computing device 102 does not match the actual URL 112. The enterprise server 114 may communicate with the client computing device 102 via a second network 108. The second network 108 may include, but is not limited to, a wide area network (WAN), a local area network (LAN), a intranet, a personal area network (PAN), and the like.

Figure 2:
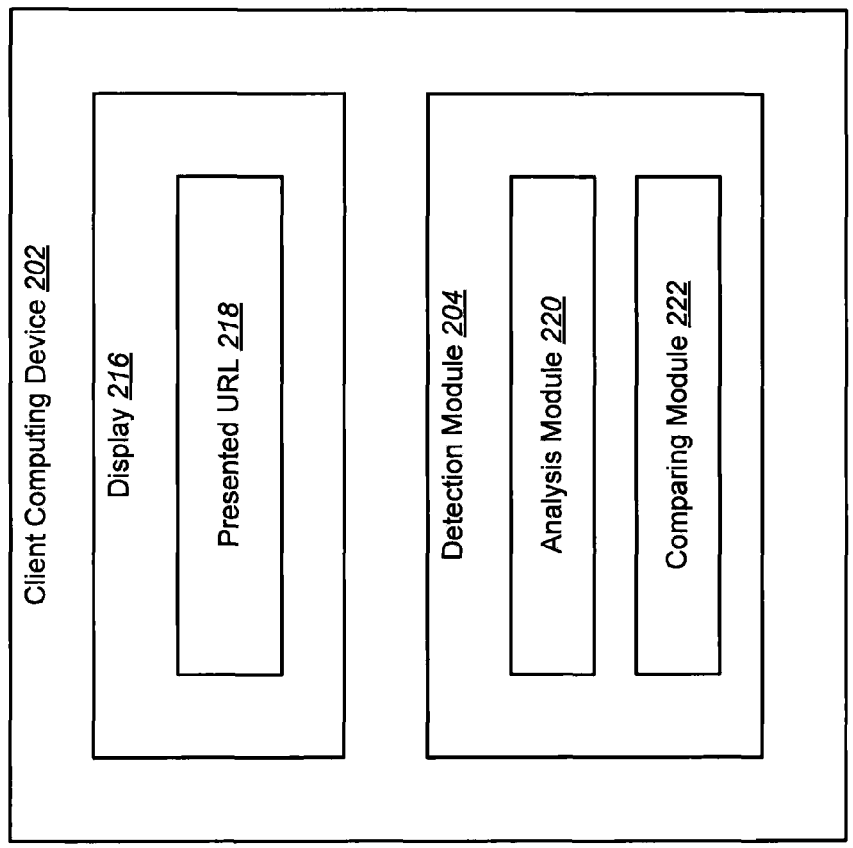
FIG. 2 is a block diagram illustrating one embodiment of a client computing device with a detection module in accordance with the present systems and methods.

FIG. 2 is a block diagram illustrating one embodiment of a client computing device 202 with a detection module 204 in accordance with the present systems and methods. In one configuration, the client computing device 202 may include a display 216, such as a monitor. The display 216 may provide a presented URL 218. The presented URL 218 may be displayed, for example, in an email message to a user of the client computing device 202.

In one example, the presented URL 218 may be associated with an actual URL. For example, if a user clicks on the presented URL 218, the URL that is actually requested may be the actual URL associated with the presented URL. In one embodiment, the actual URL may not be the same as the presented URL 218 due to URL masking and URL redirection as explained above.

In one configuration, the client computing device 202 may include a detection module 204. The detection module 204 may detect when the presented URL 218 does not match the associated actual URL. In one embodiment, the detection module 204 may include an analysis module 220 and a comparing module 222. The analysis module 220 may analyze the presented URL 218 to determine the actual URL associated with the presented URL 218. The comparing module 222 may compare the presented URL 218 to the actual URL associated with the presented URL 218. Details regarding the analysis module 220 and the comparing module 222 will be described below.

Figure 3:
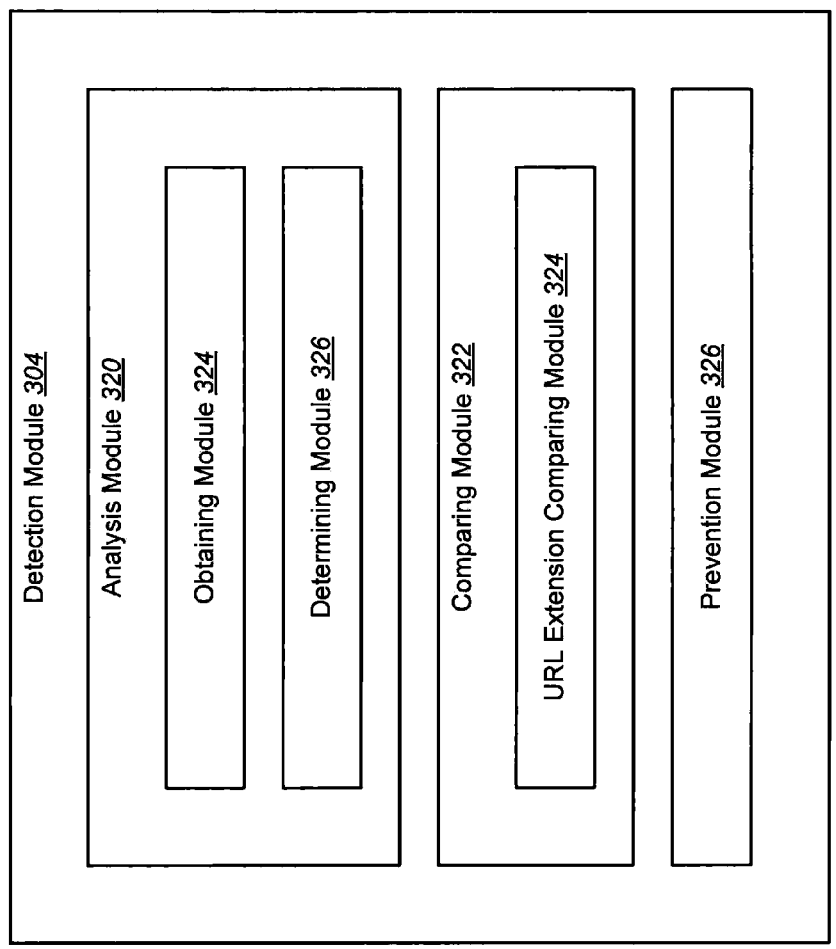
FIG. 3 is a block diagram illustrating one embodiment of a detection module in accordance with the present systems and methods.

FIG. 3 is a block diagram illustrating one embodiment of a detection module 304 in accordance with the present systems and methods. As previously explained, the detection module 304 may include an analysis module 320 and a comparing module 322. In one embodiment, the detection module 304 may also include a prevention module 326. In one example, the analysis module 320 may include an obtaining module 324 and a determining module 326. The obtaining module 324 may analyze a URL presented to a user via the display of the client computing device 304. The obtaining module 324 may analyze the presented URL to obtain the actual URL associated with the presented URL.

In one embodiment, a URL may include a particular type of extension. For example, a URL may include a .pdf extension, a .doc extension, an .exe extension, a .jpg extension, etc. The extension may indicate the type of file, program, website, etc. that is associated with the URL. For example, a URL that includes a .pdf extension may indicate that a .pdf file may be accessed by clicking the URL. In one configuration, the determining module 326 may determine the type of extension associated with the presented URL and the actual URL. For example, the determining module 326 may determine that the presented URL is associated with a non-executable extension (e.g., .pdf, .doc, .jpg, etc.) or that the presented URL is associated with an executable extension (e.g., .exe, .scr, etc.). The determining module 326 may also determine the type of extension associated with the actual URL (which may or may not be same as the presented URL). As with the presented URL, the determining module 326 may determine whether the extension of the actual URL indicates a non-executable extension or an executable extension.

In one example, the comparing module 322 may compare the presented URL with the actual URL associated with the presented URL. In one embodiment, the comparing module 322 may include a URL extension comparing module 324. This module 324 may compare the extension of the presented URL with the extension of the actual URL. If the extensions do not match (e.g., the extension of the presented URL is .pdf while the extension of the actual URL is .scr), the prevention module 326 may prevent the actual URL from being accessed.

For example, the prevention module 326 may generate a notification message to a user indicating that actual URL does not match the URL being presented on the display of the client computing device. In another embodiment, the prevention module 326 may remove the presented URL from the display of the client computing device if the comparing module 322 determines that the presented URL and the actual URL do not match. As a result, a user may be prevented from accessing potential malware by clicking on an innocent looking URL being presented on the display.

Figure 4:
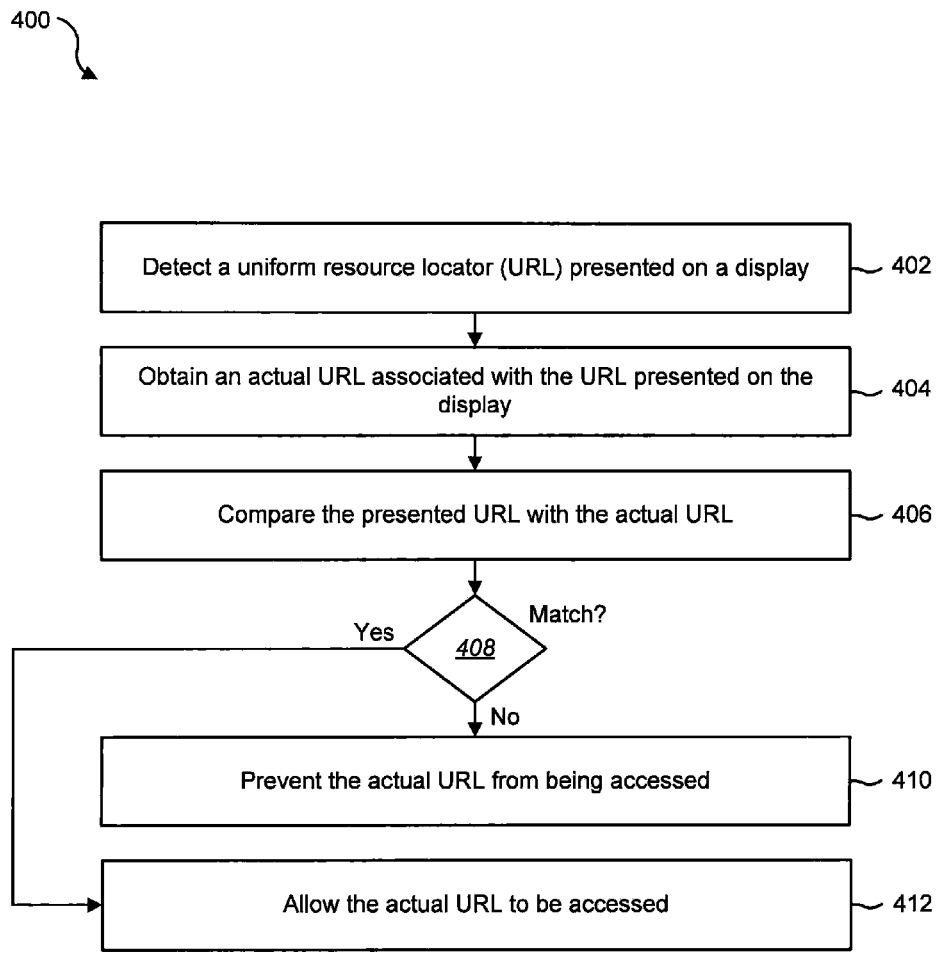
FIG. 4 is a flow diagram illustrating one embodiment of a method to detect a malicious URL by comparing a presented URL with an actual URL associated with the presented URL.

FIG. 4 is a flow diagram illustrating one embodiment of a method 400 to detect a malicious URL by comparing a presented URL with an actual URL associated with the presented URL. In one embodiment, the method 400 may be implemented by the detection module 104.

Figure 5:
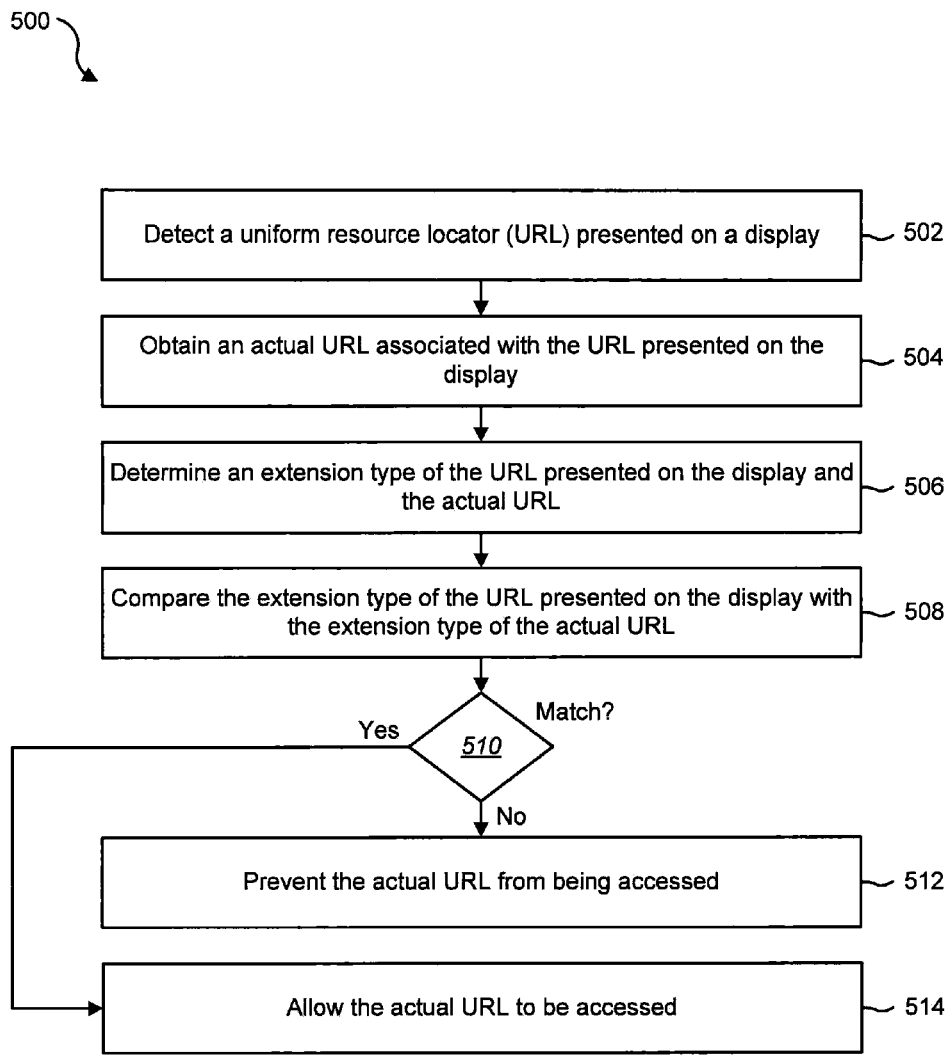
FIG. 5 is a flow diagram illustrating one embodiment of a method to detect a malicious URL by comparing an extension type of a presented URL with an extension type of an actual URL associated with the presented URL.

In one embodiment, a URL presented on a display of a client computing device may be detected 402. An actual URL associated with the URL presented on the display may be obtained 404. The URL presented on the display may be compared 406 with the actual URL. A determination 408 may be made as to whether the URLs match. If it is determined 408 that the URLs match, the actual URL may be allowed 412 to be accessed. If, however, it is determined 408 that the URLs do not match, the actual URL may be prevented 410 from being accessed FIG. 5 is a flow diagram illustrating one embodiment of a method 500 to detect a malicious URL by comparing an extension type of a presented URL with an extension type of an actual URL associated with the presented URL. In one embodiment, the method 500 may be implemented by the detection module 104.

In one embodiment, a URL presented on a display of a client computing device may be detected 502. An actual URL associated with the URL presented on the display may be obtained 504. An extension type of the URL presented on the display and the actual URL may be determined 506. The extension type of the URL presented on the display may be compared 508 with the extension type of the actual URL. A determination 510 may be made as to whether the extension types match. If it is determined 510 that the extension types match, the actual URL may be allowed 514 to be accessed. If, however, it is determined 510 that the extension types do not match, the actual URL may be prevented 512 from being accessed.

Figure 6:
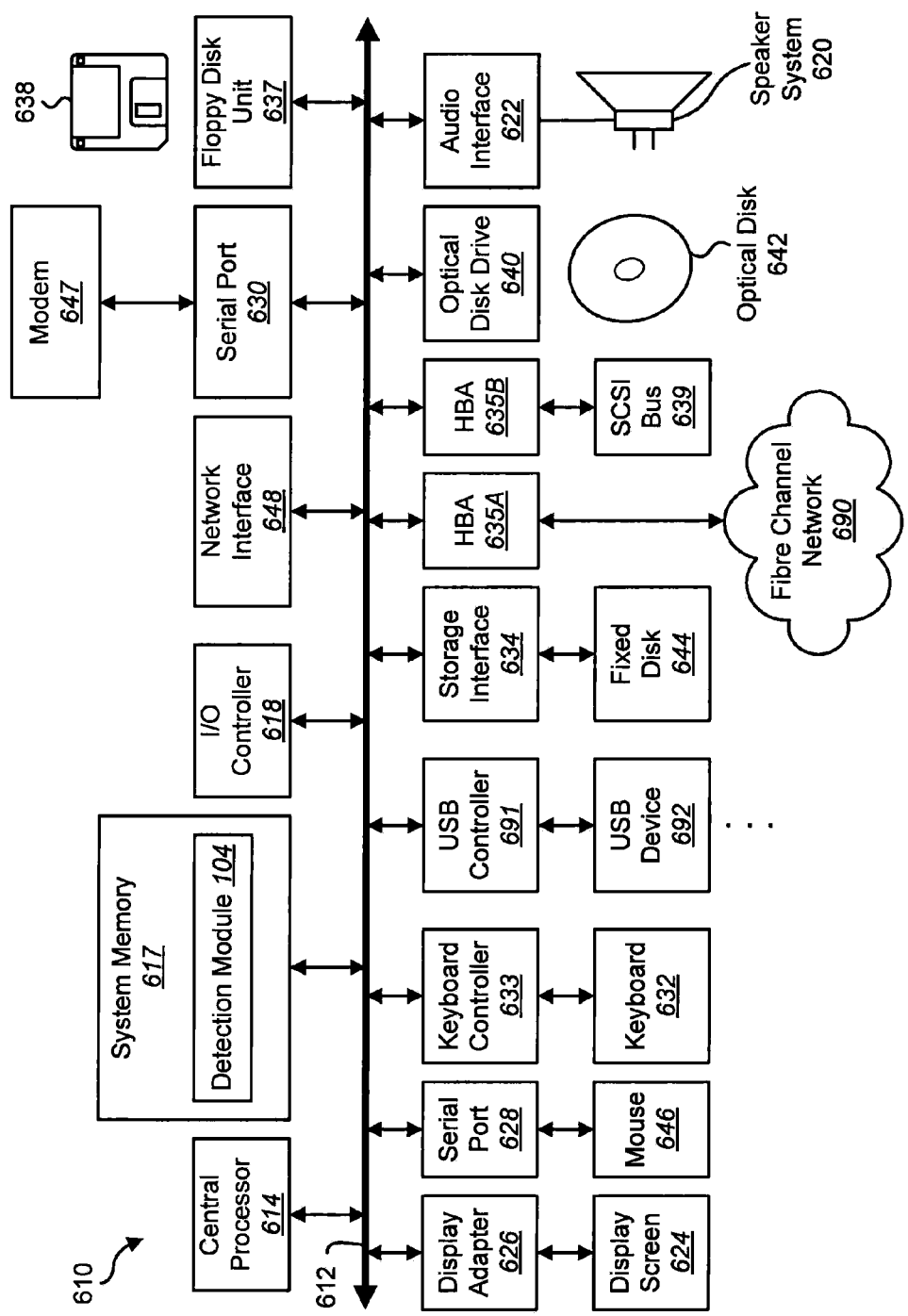
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the detection module 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
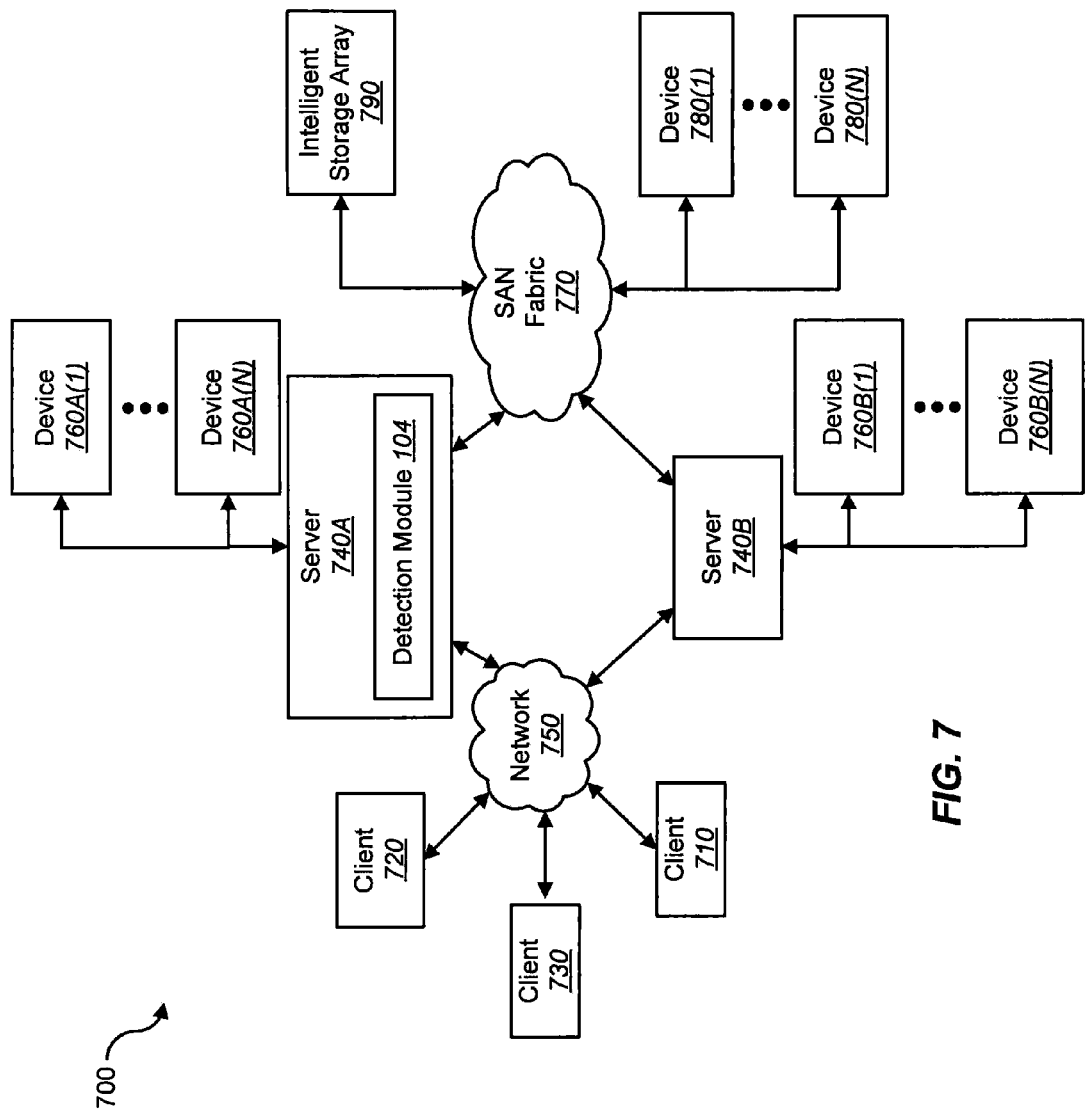
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the detection module 104 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to detect a potentially malicious uniform resource locator (URL), comprising:
   detecting a presentation of a URL on a display of a computing device;
   obtaining an actual URL associated with the URL presented on the display;
   isolating an extension type of the actual URL, wherein an extension type includes a type of file;
   determining whether the extension type of the actual URL matches a predetermined type of file;
   upon determining the extension type of the actual URL matches a predetermined type of file, comparing the isolated extension type of the actual URL with at least a portion of the URL presented on the display; and if the at least a portion of the URL presented on the display does not match the isolated extension type of the actual URL, preventing the actual URL from being accessed.

2. The method of claim 1, further comprising determining an extension type of the URL presented on the display.

3. The method of claim 1, further comprising determining whether an extension type of the actual URL comprises an executable extension.

4. The method of claim 3, wherein if the extension type of the actual URL comprises an executable extension, comparing the extension type of the URL presented on the display to the extension type of the actual URL.

5. The method of claim 1, wherein if the URL presented on the display does not match the actual URL, removing the presented URL from the display.

6. The method of claim 1, wherein if the URL presented on the display does not match the actual URL, generating a notification message indicating that the actual URL is not accessible.

7. The method of claim 1, wherein if the URL presented on the display matches the actual URL, allowing the actual URL to be accessed, wherein the actual URL is accessed by clicking on the URL presented on the display using an input device.

8. A computing device configured to detect a potentially malicious uniform resource locator (URL), comprising:
   a processor;
   memory in electronic communication with the processor;
   a display;
   instructions stored in the memory, the instructions being executable by the processor to:
      detect a presentation of a URL on the display of the computing device;
      obtain an actual URL associated with the URL presented on the display;
      isolate an extension type of the actual URL, wherein an extension type includes a type of file;
      determine whether the extension type of the actual URL matches a predetermined type of file;
      upon determining the extension type of the actual URL matches a predetermined type of file, compare the isolated extension type of the actual URL with at least a portion of the URL presented on the display; and
      if the at least a portion of the URL presented on the display does not match the isolated extension type of the actual URL, prevent the actual URL from being accessed.

9. The computing device of claim 8, wherein the instructions are executable by the processor to:
   determine an extension type of the URL presented on the display.

10. The computing device of claim 8, wherein the instructions are executable by the processor to:
   determine whether an extension type of the actual URL comprises an executable extension.

11. The computing device of claim 10, wherein if the extension type of the actual URL comprises an executable extension, the instructions are executable by the processor to:
   compare the extension type of the URL presented on the display to the extension type of the actual URL.

12. The computing device of claim 8, wherein if the URL presented on the display does not match the actual URL, the instructions are executable by the processor to:
   remove the presented URL from the display.

13. The computing device of claim 8, wherein if the URL presented on the display does not match the actual URL, the instructions are executable by the processor to:
   generate a notification message indicating that the actual URL is not accessible.

14. The computing device of claim 8, wherein if the URL presented on the display matches the actual URL, the instructions are executable by the processor to:
   allow the actual URL to be accessed, wherein the actual URL is accessed by clicking on the URL presented on the display using an input device.

15. A computer-program product for detecting a potentially malicious uniform resource locator (URL), the computer-program product comprising a non-transitory computer-readable medium storing instructions thereon, the instructions being executable by the processor to:
   detect a presentation of a URL on a display of a computing device;
   obtain an actual URL associated with the URL presented on the display;
   isolate an extension type of the actual URL, wherein an extension type includes a type of file;
   determine whether the extension type of the actual URL matches a predetermined type of file;
   upon determining the extension type of the actual URL matches a predetermined type of file, compare the isolated extension type of the actual URL with at least a portion of the URL presented on the display; and
   if the at least a portion of the URL presented on the display does not match the isolated extension type of the actual URL, prevent the actual URL from being accessed.

16. The computer-program product of claim 15, wherein the instructions are executable by the processor to:
   determine an extension type of the URL presented on the display.

* * * * *